(12) United States Patent
Schweikert et al.

(10) Patent No.: US 6,901,341 B2
(45) Date of Patent: May 31, 2005

(54) SMART RESOLUTION VALVE PRESSURE CONTROL

(75) Inventors: David E. Schweikert, Moore, SC (US); James A. Wood, Spartanburg, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/807,627

(22) Filed: Mar. 24, 2004

(65) Prior Publication Data

US 2004/0210412 A1 Oct. 21, 2004

Related U.S. Application Data

(62) Division of application No. 10/338,513, filed on Jan. 8, 2003, now Pat. No. 6,799,132.

(51) Int. Cl.$^7$ .......................... G01L 27/00; B60T 8/32; B60T 8/34

(52) U.S. Cl. ....................... 702/114; 303/157; 303/162; 701/78; 701/79; 702/148

(58) Field of Search ................................. 702/108, 113, 702/114, 148, 141; 701/99, 74, 75, 78, 79; 303/3, 127, 157, 162, 176

(56) References Cited

U.S. PATENT DOCUMENTS

| 4,674,049 A | * | 6/1987 | Kubo .......................... 701/79 |
| 4,704,684 A | * | 11/1987 | Kubo .......................... 701/78 |
| 4,748,564 A | * | 5/1988 | Matsuda ....................... 701/79 |
| 5,281,009 A | | 1/1994 | Kidston et al. ............. 303/162 |
| 5,458,404 A | | 10/1995 | Fennel et al. ............... 303/176 |

* cited by examiner

Primary Examiner—John Barlow
Assistant Examiner—John Le
(74) Attorney, Agent, or Firm—Webb Ziesenheim Logsdon Orkin & Hanson, P.C.

(57) ABSTRACT

The Smart Resolution Valve Pressure Control System allows any pressure control system using valve state pulsing to modify airflow at an optimum and consistent range of operation thereby enhancing control accuracy and increasing the useable cycle life of any valve combination used.

6 Claims, 6 Drawing Sheets

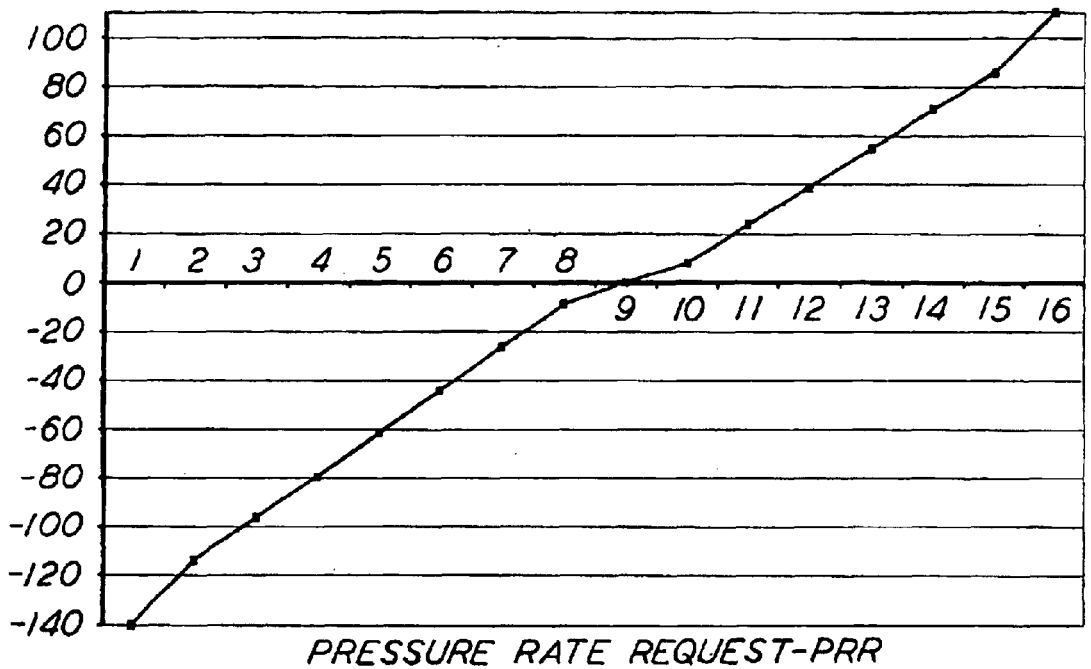
Fig. 2 -PRIOR ART
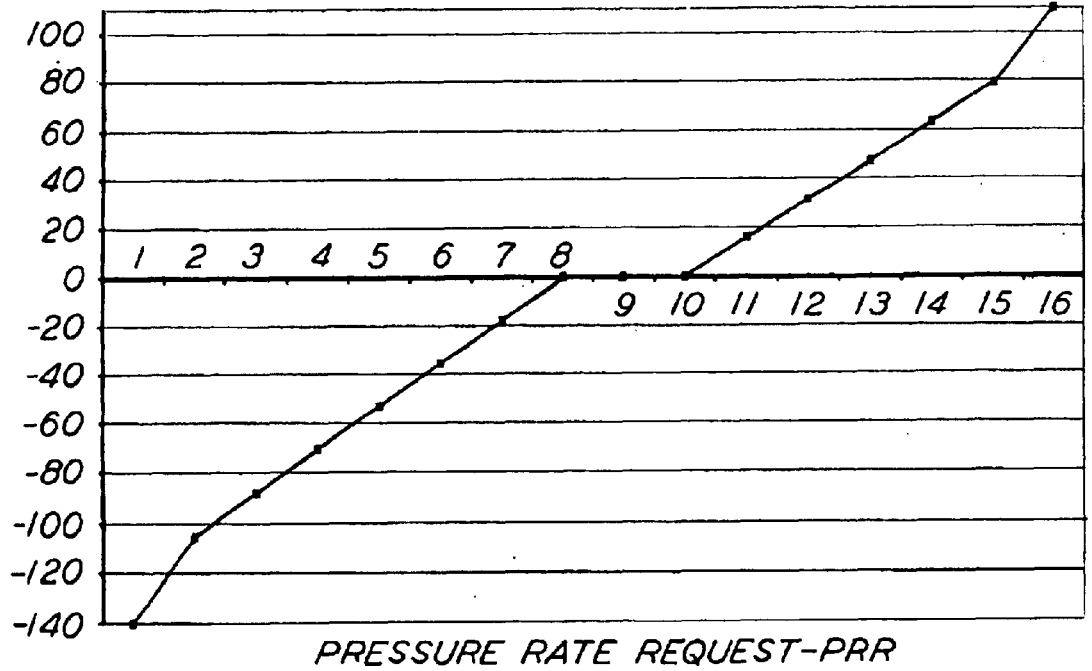
Fig. 3 -PRIOR ART

SMART RESOLUTION VALVE PRESSURE CONTROL

This application is a Divisional Application of patent application Ser. No. 10/338,513 filed Jan. 8, 2003 now U.S. Pat. No. 6,799,132.

FIELD OF THE INVENTION

The present invention generally relates to valve pressure control and, more particularly, relates to the valve pressure control as it relates to brake and wheel slip control on a transit railway vehicle and, still more particularly, to a microprocessor for controlling the control logic of a passenger transit vehicle and, even more particularly, to a microprocessor system designed to control the magnet valves, apply and release the magnet valves for proper fixed pulse timing to improve the lifecycle of these valves.

BACKGROUND OF THE INVENTION

There are known, in the prior art, many transit systems that require brake and/or wheel slip control and use microprocessors that run wheel slip calculations and control logic at 20 milliseconds (ms) intervals, and which generally use single 20 ms interrupts. The 20 ms interrupt control has proven sufficient for most applications in the past with simpler system interfaces and larger brake cylinder pressure tolerances. However, since current and future systems are becoming more sophisticated which necessitates tighter control requirements and which can be used in a broader range of applications and tolerances. The use of the single 20 ms time step has become a limitation in certain present applications. For example, several three-state valves that were used to control brake cylinder pressure have had problems maintaining stability with tight tolerances, and in some configurations cannot achieve brake cylinder pressure changes as small as 1 or 2 psi. Even if the system is successfully calibrated to achieve these tight tolerances initially, they cannot be maintained for long time periods as the magnet valve components wear.

SUMMARY OF THE INVENTION

In one aspect the present invention provides a microprocessor based smart resolution valve pressure control system for performing a wheel slip control valve response test. Included in the system is a sensing means and a begin decision means for ensuring that brakes disposed on the truck of a vehicle are at full service and that a truck brake cylinder pressure (BCP) is greater than a first predetermined BCP. Also included is a first testing means connected to a wheel slip control valve for pulse releasing a wheel slip control valve to determine an elapsed time that the truck BCP drops from a second predetermined BCP to a third predetermined BCP. The system also includes a release time adjustment means connected to the first testing means for either adding or subtracting to and from, respectively, a release time and hold time depending on the elapsed time. Also included is a release time decision means for detecting if the release time adjustment means has changed the release time, and a reapply brake cylinder pressure means connected to the release time decision means for enabling again the first testing means if the release time has changed. The system also includes an exhaust brake cylinder pressure means connected to the release time decision means for sending a pulsed release signal and a pulsed hold signal to a control valve and a continue decision means connected between the exhaust brake cylinder pressure means and a second testing means for ensuring that an exhaust BCP is less than a predetermined amount. The second testing means applies an apply pulse to a control valve for a predetermined time and times a BCP rise between a fourth predetermined BCP and a fifth predetermined BCP. Also included in the system is an apply time adjustment means connected to the second testing means for either adding or subtracting to and from, respectively, an apply time and hold time depending on the time of the BCP rise between the fourth and fifth predetermined BCP. An apply time decision means connected to the apply time adjustment means for sending either an enabling signal to a release brake cylinder pressure means connected to the apply time decision means if the apply time has changed, or to an end wheel slip control valve test signal. The release brake cylinder pressure means, when enabled, enables again the second testing means.

Another aspect of the present invention provides a microprocessor based smart resolution valve pressure control apparatus used to control a wheel slip control magnet valve. Included in the apparatus is a logic control means for providing one of a release time and an application time together with a hold time. The apparatus also includes a change decision means connected to a logic control means for determining if either the release time or the application time, or the hold time have changed since a last cycle of the apparatus used to control a wheel slip control magnet valve. There is a valve timing set up means connected to a change decision means for setting either a release time, an application time, or a hold time if either the release time or the application time have changed. A pulse timing means is connected to a change decision means and the valve timing set up means for determining if a remaining pulse time is equal to 0, and enabling a hold timing means if the remaining pulse time is equal to 0, and enabling a pulse timer decrement means if the remaining pulse time is greater than 0. The hold timing means is connected to the pulse timing means for determining if a remaining hold time is equal to 0, and enabling a timer's reset means if the remaining hold time is equal to 0, and enabling a hold timer decrement means if the remaining hold time is greater than 0. The pulse timer decrement means and the hold timer decrement means decrement one of the remaining pulse time and the remaining hold time, respectively, and enables a valve control means. There is a timer's reset means for resetting the pulse timing means and the hold timing means. The valve control means enables a magnet valve based on the current pulse time or hold time, and an end interrupt routine means for ending a current repetition of controlling the wheel slip control magnet valve after either enabling the magnet valve, or resetting the pulse timing means and the hold timing means.

Yet another aspect of the present invention provides a microprocessor based smart resolution valve pressure control method for calibrating a smart resolution valve pressure control having a plurality of release times and a corresponding plurality of hold times. The method includes applying a release pulse of a first predetermined duration of one of a selected plurality of release times and applying a hold pulse of a second predetermined duration corresponding to the selected plurality of release times to a valve controlling the pressure to a brake cylinder, wherein the brake cylinder initially has a minimum first predetermined pressure. The method also includes a) measuring the elapsed time that the brake cylinder changes from a second predetermined pressure to a third predetermined pressure, and b) increasing the first predetermined duration and decreasing the second predetermined duration if the elapsed time is greater than a first predetermined time, and decreasing the first predetermined duration and increasing the second predetermined duration if said elapsed time is less than a second predetermined time. Also included in the method is repeating steps a) and b) if the first predetermined duration changes.

A further aspect of the present invention provides a microprocessor based smart resolution valve pressure control method for calibrating a smart resolution valve pressure control having a plurality of application times and a corresponding plurality of hold times. The method includes applying an application pulse of a first predetermined duration of the plurality of application times and applying a hold pulse of a second predetermined duration corresponding to the selected plurality of application times to a valve controlling the pressure to a brake cylinder, wherein the brake cylinder initially has a maximum first predetermined pressure. The method also includes a) measuring the elapsed time the brake cylinder changes from a second predetermined pressure to a third predetermined pressure, and b) increasing the first predetermined duration and decreasing the second predetermined duration if the elapsed time is greater than a first predetermined time, and decreasing the first predetermined duration and increasing the second predetermined duration if the elapsed time is less than a second predetermined time. Also included in the method is repeating steps a) and b) if the first predetermined duration changes.

OBJECTS OF THE INVENTION

It is, therefore, one of the primary objects of the present invention to provide a smart resolution valve pressure control to allow any pressure control system using valve state pulsing to provide an airflow rate having an optimum and consistent range of operation.

Another object of the present invention is to provide a smart resolution valve pressure control system which provides the valve-control interrupt pressure commands from the calculations performed during the primary control interrupt of a microprocessor.

Another object of the present invention is to provide a smart resolution valve pressure control system to generate the necessary valve commands to achieve the requested pressure calculated from the primary control interrupt process.

Another object of the present invention is to provide a smart resolution valve pressure control system to communicate and interface with the valve every millisecond instead of every 20 ms to allow a greater degree of valve control, which improves control accuracy.

Yet another object of the present invention is to provide a smart resolution valve pressure control system to provide an accurate pressure output within a desired bandwidth which utilizes a smart algorithm that relies on a self-adjusting calibrated pulse time for a minimum pressure adjustment.

Yet another object of the present invention is to provide a smart resolution valve pressure control system to reduce the valve cycles significantly and to thereby increase the valve life.

Still another object of the present invention is to provide a smart resolution valve pressure control system to provide an improved shorter interrupt control time.

Although a number of objects and advantages of the present invention have been described in some detail above, various additional objects and advantages of the smart resolution valve pressure control of the present invention will become more readily apparent to those persons who are skilled in the art from the following more detailed description of the invention, particularly, when such detailed description of the invention is taken in conjunction with the attached Figures and the appended claims.

BRIEF DESCRIPTION OF THE DRAWINGS

FIG. 2 is a graphical illustration of Pressure Rate Request vs. Airflow (psi/sec) for a prior art new wheel slip valve;

FIG. 3 is a graphical illustration of Pressure Rate Request vs. Airflow (psi/sec) for a prior art worn wheel slip valve;

Figure 1A:
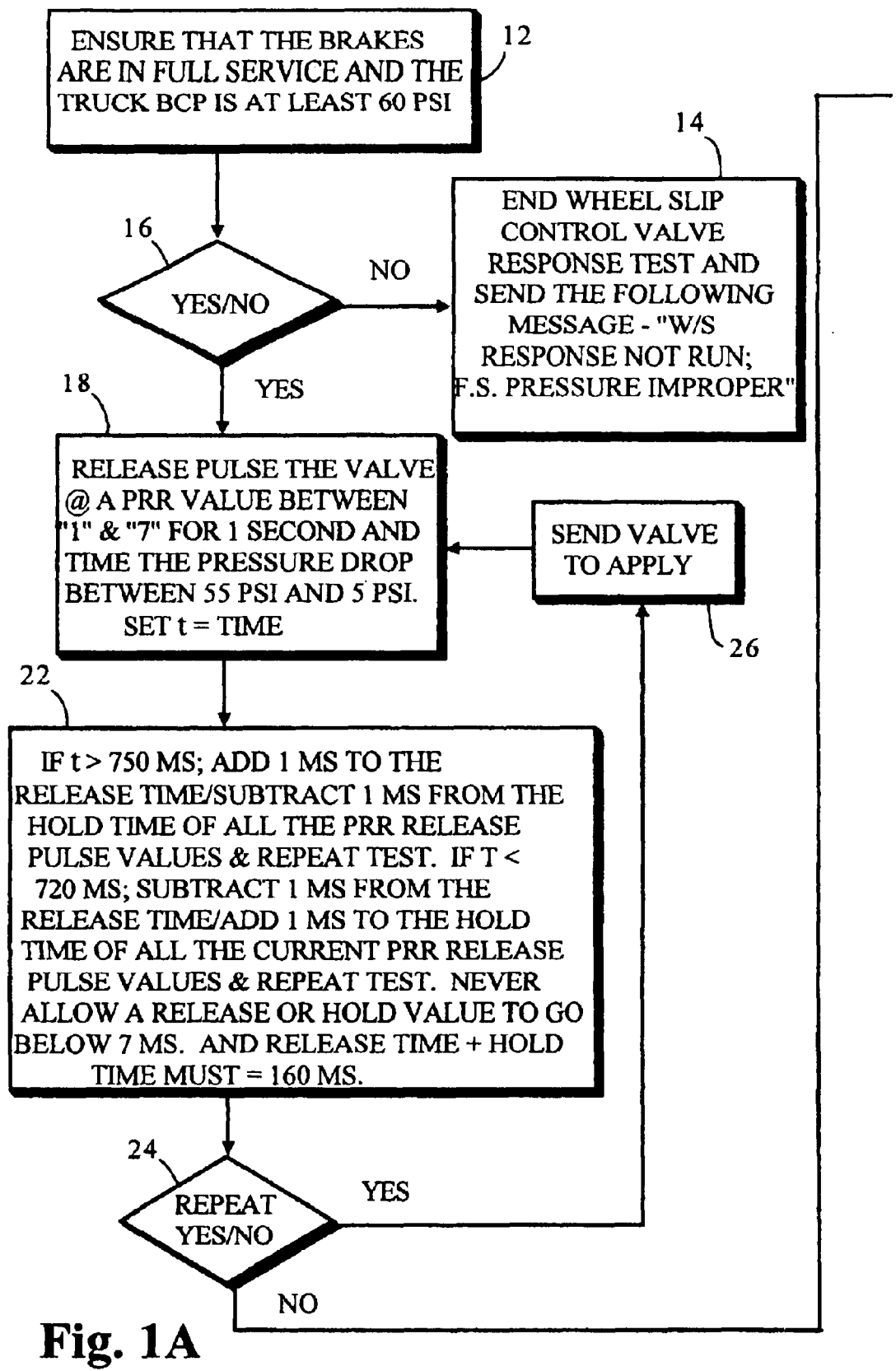
FIG. 1 is a combination block drawing and flow chart showing a presently preferred embodiment of a microprocessor based smart resolution valve pressure control system for calibration of a control process used during regulation of the pressure in a brake cylinder during a wheel slip condition.

DETAILED DESCRIPTION OF A PRESENTLY PREFERRED AND VARIOUS ALTERNATIVE EMBODIMENTS OF THE INVENTION

Prior to proceeding with the more detailed description of the invention, it should be noted that for the sake of clarity, identical components of the smart resolution valve pressure control, which have identical functions, have been identified with identical reference letters throughout the views illustrated in the drawings.

In the presently preferred embodiment, this invention provides a method and apparatus to allow any pressure control system using valve state pulsing to modify airflow at an optimum and consistent range of operation. The presently preferred embodiment of this invention also provides a plurality of valve-control pressure interrupt commands between the primary control interrupts of a microprocessor. The presently preferred embodiment of this invention also provides communication and interface with the valve every millisecond instead of every 20 ms to allow a greater degree or valve control, which improves control accuracy.

Figure 1B:
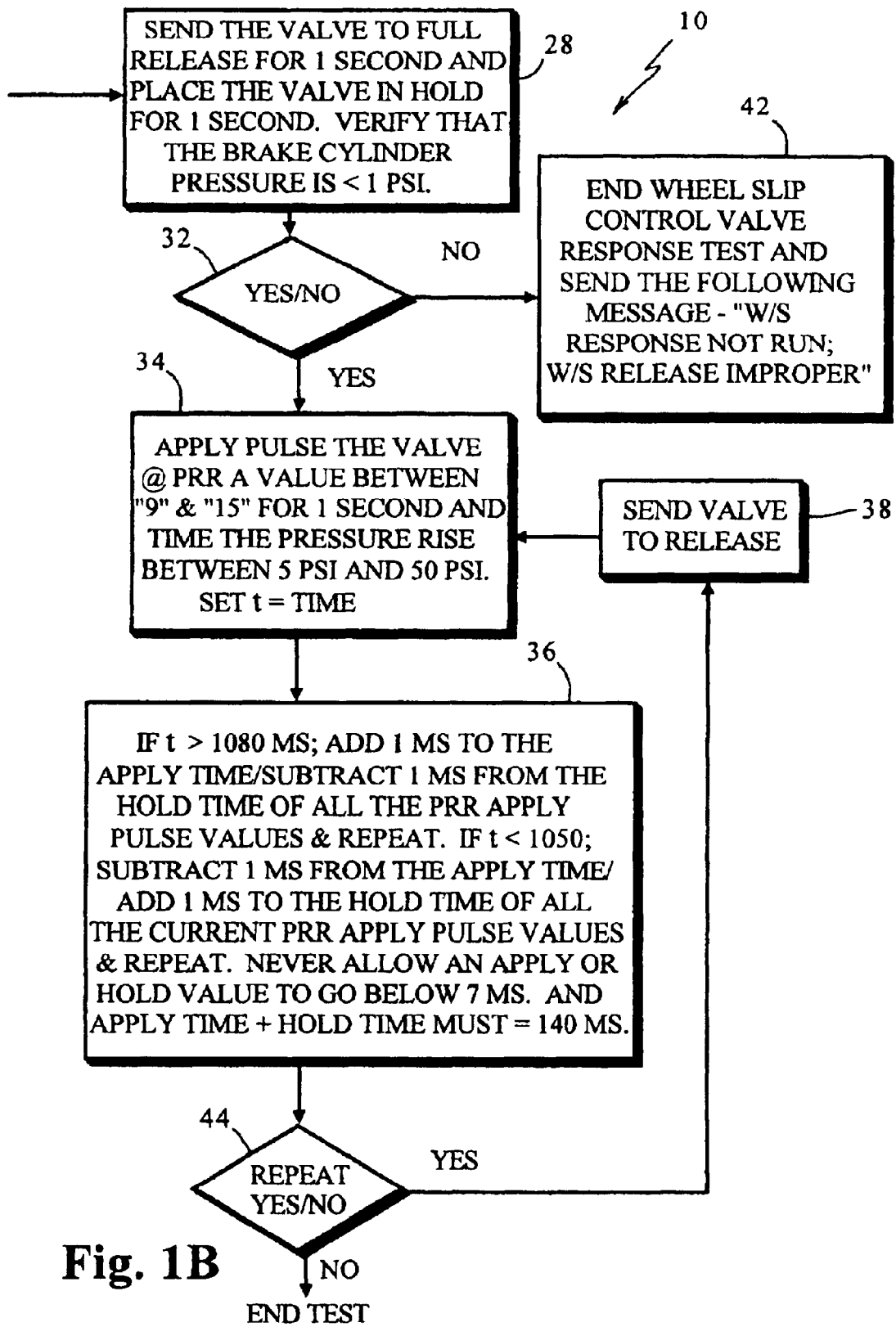
Figure 5:
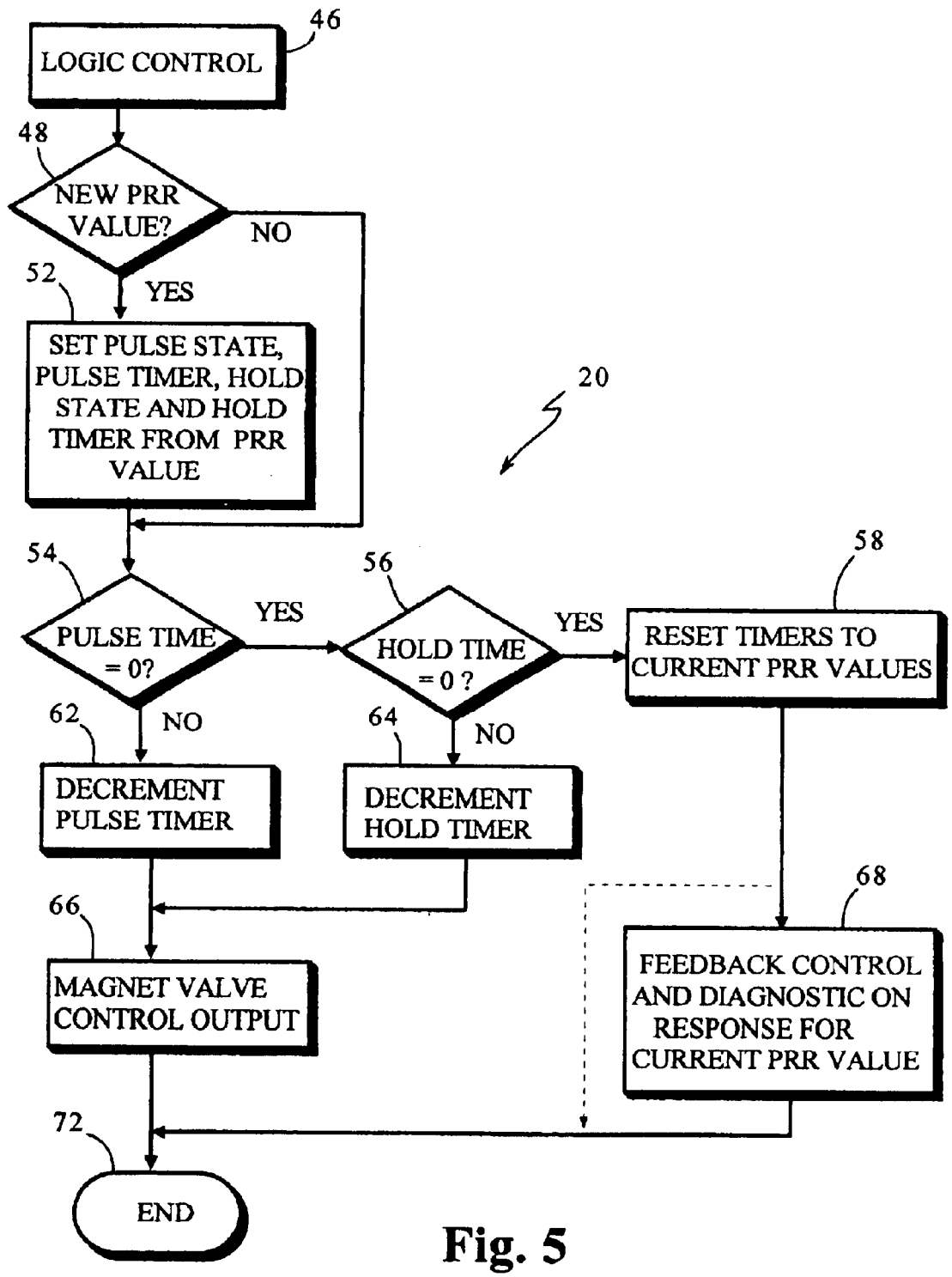
FIG. 5 is a combination block drawing and flow chart showing a presently preferred embodiment of a microprocessor based smart resolution valve pressure control process used when regulating brake cylinder pressure during a wheel slip condition.
Figure 6:
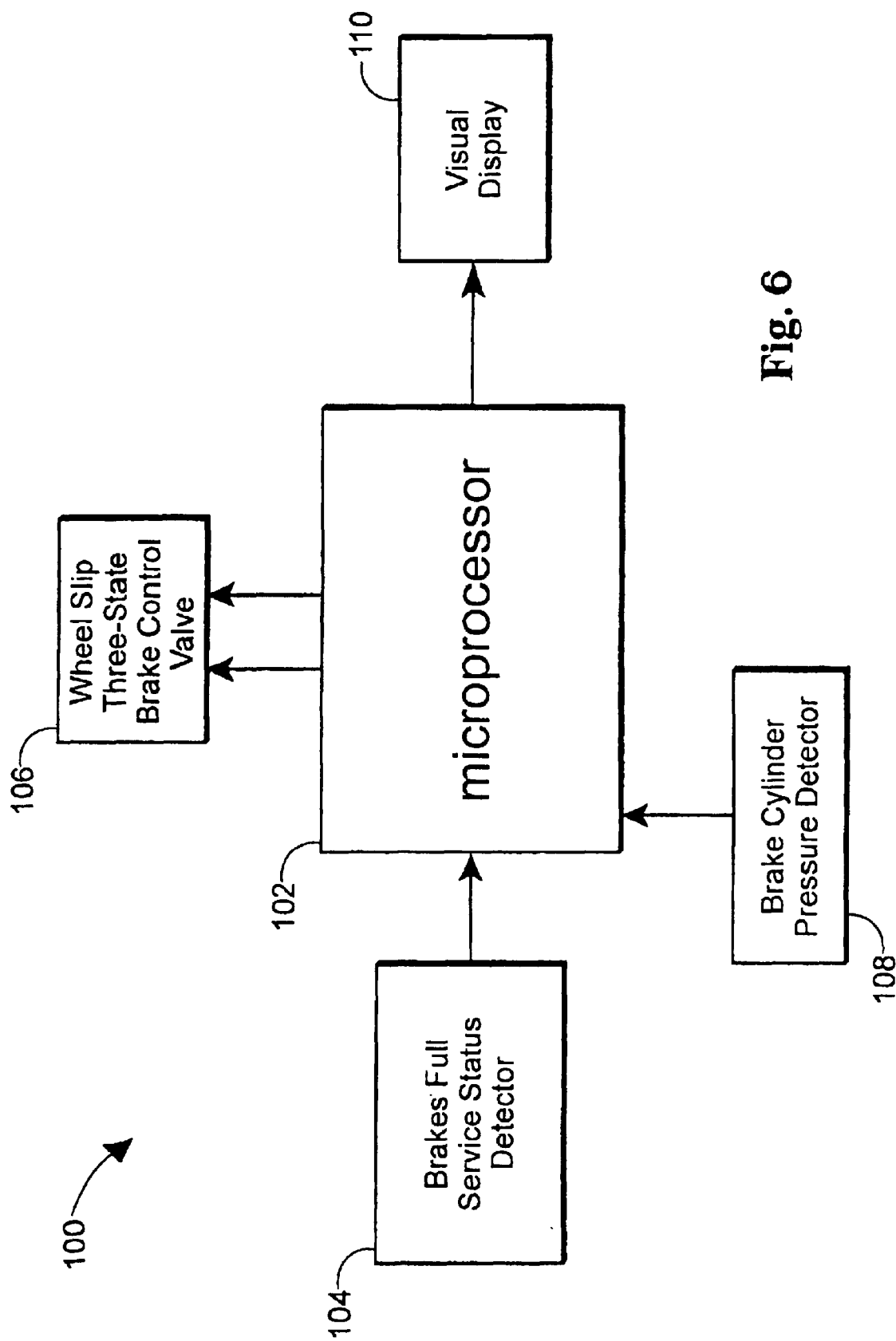
FIG. 6 is a block diagram of hardware used in the preferred embodiment of the present invention.

Reference is now made to FIGS. 1, 5, and 6. Illustrated therein is a presently preferred embodiment for calibration of a smart resolution valve pressure controller, generally designated 10. FIG. 6 is a block diagram of the hardware, generally designated 100, which supports FIGS. 1 and 5. In the presently preferred embodiment, a microprocessor based calibration system 10 for a smart resolution valve pressure control system for a control valve comprises a microprocessor 102, a brake cylinder pressure detector 108, and a brakes full service status detector 104 in FIG. 6, and in FIG. 1, a sensing means 12 for ensuring that brakes disposed on a truck of a vehicle (such as a subway car) are at full service and the truck brake cylinder pressure is at least 60 psi. It will be understood that in the preferred embodiment the sensing means 12 includes the brakes full service status detector 104, the brake cylinder pressure detector 108 and algorithms in the microprocessor 102. The creation of this algorithm and other algorithms implied in FIGS. 1 and 5 are within the ability of someone skilled in the art of microprocessor software design.

Connected to the sensing means 12 is a begin decision means 16 which enables a first message communicator means 14 if the brakes are not in full service or the brake cylinder pressure (BCP) is less than 60 psi. The first message communicator means 14 includes a visual display 110, used for sending a wheel slip response test message "W/S Response Not Run; Pressure Improper" when a BCP is improper, or the brakes are not in full service as indicated by the sensing means 12.

The begin decision means 16 enables a first testing means 18 when the brakes are in full service and the BCP is at least 60 psi. The first testing means 18 includes a wheel slip three-state brake control valve 106. With the brakes in full service and a BCP of at least 60 psi, the control valve 106 is pulse released at one of the pressure rate request values from 1 through 7, for example a pressure rate request value of "4", for 1 second. The elapsed time for a pressure drop between 55 psi and 5 psi is determined for use by a release time adjustment means 22.

Connected to the first testing means 18 is the release time adjustment means 22 for adding to, or subtracting from, a release time and hold time depending on the elapsed time determined by the first testing means 18. More particularly, the release time adjustment means 22 determines if the time determined by the first testing means 18 is greater than 750 ms, in which case 1 ms is added to the current release time and 1 ms is subtracted from the current hold time. The release time adjustment means 22 also determines if the elapsed time is less than 720 ms in which case 1 ms is subtracted for all the release times of the current pressure rate request value, and 1 ms is added to the current pressure rate request hold time. The release time adjustment means 22 also restricts the minimum times of the release and hold times to 7 ms. The release time adjustment means 22 also ensures that the current pressure rate request value has a total release time and hold time of 160 ms.

A release time decision means 24 monitors the activities of the release time adjustment means 22 and sends an execution signal to either a reapply brake cylinder pressure means 26 or an exhaust brake cylinder pressure means 28. If the release time adjustment means 22 adjusts the release time (and hold time), then the release time decision means 24 enables the reapply brake cylinder pressure means 26, otherwise it enables the exhaust brake cylinder pressure means 28. The reapply brake cylinder pressure means 28 re-enables the first testing means 18.

The exhaust brake cylinder pressure means 28 sets the valve 106 to full release for 1 second followed by a 1 second hold, after which the exhaust brake cylinder pressure means 28 detects if the BCP is less than 1 psi.

Connected to the exhaust brake cylinder pressure means 28 is a continue decision means 32 which enable a second message communicator means 42 if the BCP, after the 1 second release and 1 second hold, is greater than 1 psi. The second message communicator means 42 includes the visual display 110, used for sending a wheel slip response test message "W/S Response Not Run; Release Improper" when the BCP is greater than 1 psi.

The continue decision means 32 enables a second testing means 34 when the BCP is less than 1 psi. The second testing means 34 includes the wheel slip three-state brake control valve 106. With the BCP less than 1 psi the control valve 106 is pulse released at one of the pressure rate request values from 9 through 15, for example a pressure rate request value of "12", for 1 second. The elapsed time for a pressure rise between 5 psi and 50 psi is determined for use by an apply time adjustment means 36.

Connected to the second testing means 34, the apply time adjustment means 36 adds to, or subtracts from, an apply time and hold time depending on the elapsed time determined by the second testing means 34. More particularly, the apply time adjustment means 36 determines if the elapsed time from the second testing means 34 is greater than 1080 ms in which case 1 ms is added to the current apply time and 1 ms is subtracted from the current hold time. The apply time adjustment means 36 also determines if the elapsed time is less than 1050 ms in which case 1 ms is subtracted from the current apply time, and 1 ms is added to the current hold time. The apply time adjustment means 36 also restricts the minimum times of the apply and hold times to 7 ms or greater. The apply time adjustment means 36 also verifies that the current pressure rate request value has a total apply time and hold time of 140 ms.

An apply time decision means 44 monitors the activities of the apply time adjustment means 36 and either enables a release brake cylinder pressure means 38 or ends the interrupt and the calibration of the smart resolution pressure controller. If the apply time adjustment means 36 adjusts the apply time (and hold time), then the apply time decision means 44 enables the release brake cylinder pressure means 38, otherwise it ends the calibration. The release brake cylinder pressure means 38 re-enables the second testing means 34.

Graphically illustrated in FIG. 2 is the pressure rate request vs. airflow for a prior art example of airflow control based on a valve control sequence with a 20 ms repetition rate for a brand new three-state wheel slip control valve 106 as shown in Table 1:

TABLE 1

| Pressure Rate Request Value | Definition | Operational Valve State |
|---|---|---|
| 15 | Full Flow application −110 psi/sec | Continuous Apply, 0 ms Hold |
| 14 | 86 psi/sec | 120 ms Apply 20 ms Hold |
| 13 | 71 psi/sec | 100 ms Apply 40 ms Hold |
| 12 | 55 psi/sec | 80 ms Apply 60 ms Hold |
| 11 | 39 psi/sec | 60 ms Apply 80 ms Hold |
| 10 | 24 psi/sec | 40 ms Apply 100 ms Hold |
| 9 | 8 psi/sec | 20 ms Apply 120 ms Hold |
| 8 | Hold −0 psi/sec | 0 ms Apply/Release Continuous Hold |
| 7 | −9 psi/sec | 20 ms Release 140 ms Hold |
| 6 | −26 psi/sec | 40 ms Release 120 ms Hold |
| 5 | −44 psi/sec | 60 ms Release 100 ms Hold |
| 4 | −61 psi/sec | 80 ms Release 80 ms Hold |
| 3 | −79 psi/sec | 100 ms Release 60 ms Hold |
| 2 | −96 psi/sec | 120 ms Release 40 ms Hold |
| 1 | −114 psi/sec | 140 ms Release 20 ms Hold |
| 0 | Full Release −140 psi/sec | Continuous Release 0 ms Hold |

Graphically illustrated in FIG. 3 is the pressure rate request vs. airflow for a prior art example of airflow control for an old wheel slip three-state control valve 106 as shown in Table 2:

TABLE 2

| Pressure Rate Request Value | Definition | Operational Valve State |
|---|---|---|
| 15 | Full Flow application −110 psi/sec | Continuous Apply, 0 ms Hold |
| 14 | 79 psi/sec | 120 ms Apply 20 ms Hold |
| 13 | 63 psi/sec | 100 ms Apply 40 ms Hold |
| 12 | 47 psi/sec | 80 ms Apply 60 ms Hold |
| 11 | 31 psi/sec | 60 ms Apply 80 ms Hold |
| 10 | 16 psi/sec | 40 ms Apply 100 ms Hold |
| 9 | 0 psi/sec | 20 ms Apply 120 ms Hold |
| 8 | Hold −0 psi/sec | 0 ms Apply/Release Continuous Hold |
| 7 | 0 psi/sec | 20 ms Release 140 ms Hold |
| 6 | −18 psi/sec | 40 ms Release 120 ms Hold |
| 5 | −35 psi/sec | 60 ms Release 100 ms Hold |
| 4 | −53 psi/sec | 80 ms Release 80 ms Hold |
| 3 | −70 psi/sec | 100 ms Release 60 ms Hold |
| 2 | −88 psi/sec | 120 ms Release 40 ms Hold |
| 1 | −105 psi/sec | 140 ms Release 20 ms Hold |
| 0 | Full Release −140 psi/sec | Continuous Release 0 ms Hold |

Due to the increase of the dead time characteristics in the wheel slip three-state brake control valve 106 as its cycle life progresses, the valve's flow for pulsed operation is offset so much that pressure rate response 8, pressure rate response 9, and pressure rate response 10 have no airflow. Only pressure rate response 9 should have no airflow, and continuation of the trend illustrated in FIG. 3 will result in increased degradation of the wheel slip control performance.

Figure 4:
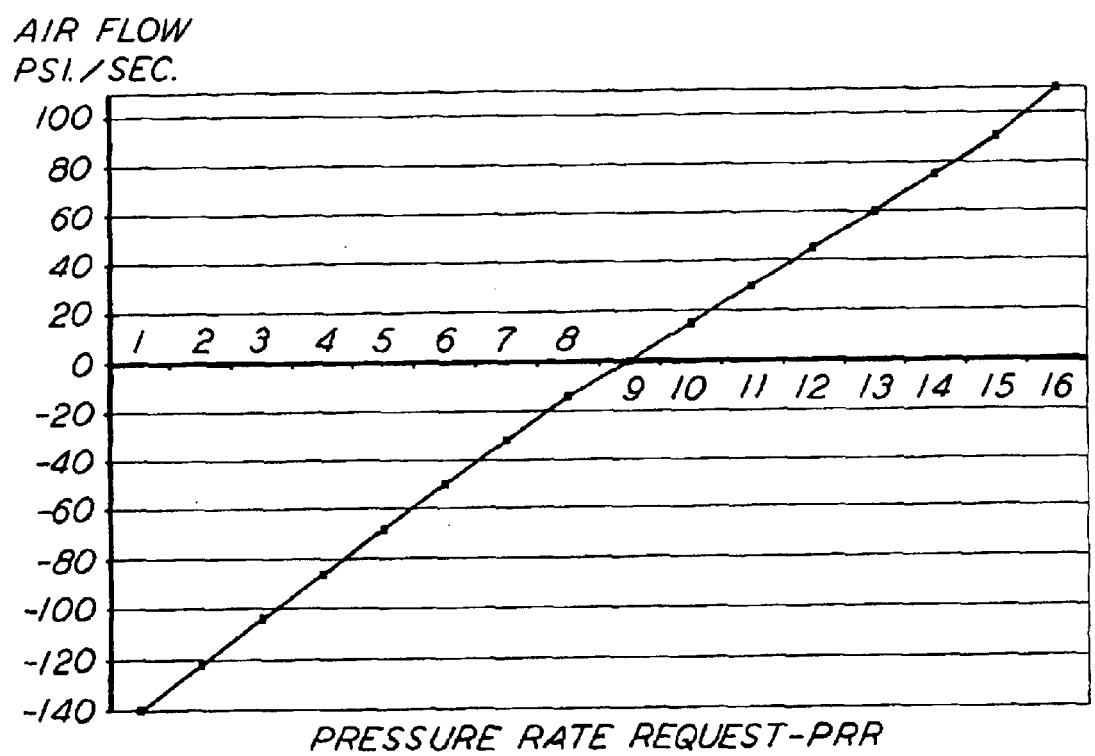
FIG. 4 is a graphical illustration of Pressure Rate Request vs. Airflow (psi/sec) for both a new and a worn wheel slip valve using the presently preferred smart resolution valve pressure control.

Graphically illustrated in FIG. 4 is the pressure rate request vs. airflow for both the new and worn wheel slip control valves using the presently preferred smart resolution valve pressure control for a three-state wheel slip control valve 106 as shown in the following tables 3 and 4:

TABLE 3

(New Valve)

| Pressure Rate Request Value | Definition | Operational Valve State |
|---|---|---|
| 15 | Full Flow application −110 psi/sec | Continuous Apply, 0 ms Hold |
| 14 | 90 psi/sec | 125 ms Apply 15 ms Hold |
| 13 | 75 psi/sec | 105 ms Apply 35 ms Hold |
| 12 | 60 psi/sec | 86 ms Apply 54 ms Hold |
| 11 | 45 psi/sec | 67 ms Apply 73 ms Hold |
| 10 | 30 psi/sec | 48 ms Apply 92 ms Hold |
| 9 | 15 psi/sec | 29 ms Apply 111 ms Hold |
| 8 | Hold −0 psi/sec | 0 ms Apply/Release Continuous Hold |
| 7 | −14 psi/sec | 26 ms Release 134 ms Hold |
| 6 | −32 psi/sec | 47 ms Release 113 ms Hold |
| 5 | −50 psi/sec | 67 ms Release 93 ms Hold |
| 4 | −68 psi/sec | 88 ms Release 72 ms Hold |
| 3 | −86 psi/sec | 108 ms Release 52 ms Hold |
| 2 | −104 psi/sec | 129 ms Release 31 ms Hold |
| 1 | −122 psi/sec | 149 ms Release 11 ms Hold |
| 0 | Full Release −140 psi/sec | Continuous Release 0 ms Hold |

TABLE 4

(Worn Valve)

| Pressure Rate Request Value | Definition | Operational Valve State |
|---|---|---|
| 15 | Full Flow application −110 psi/sec | Continuous Apply, 0 ms Hold |
| 14 | 90 psi/sec | 133 ms Apply 7 ms Hold |
| 13 | 75 psi/sec | 115 ms Apply 25 ms Hold |
| 12 | 60 psi/sec | 96 ms Apply 44 ms Hold |
| 11 | 45 psi/sec | 77 ms Apply 63 ms Hold |
| 10 | 30 psi/sec | 58 ms Apply 82 ms Hold |
| 9 | 15 psi/sec | 39 ms Apply 101 ms Hold |
| 8 | Hold −0 psi/sec | 0 ms Apply/Release Continuous Hold |
| 7 | −14 psi/sec | 16 ms Release 144 ms Hold |
| 6 | −32 psi/sec | 37 ms Release 123 ms Hold |
| 5 | −50 psi/sec | 57 ms Release 103 ms Hold |
| 4 | −68 psi/sec | 98 ms Release 62 ms Hold |
| 3 | −86 psi/sec | 139 ms Release 21 ms Hold |
| 2 | −104 psi/sec | 153 ms Release 7 ms Hold |
| 1 | −122 psi/sec | 153 ms Release 7 ms Hold |
| 0 | Full Release −140 psi/sec | Continuous Release 0 ms Hold |

Referring now to FIG. 5, illustrated therein is an apparatus 20 used in a valve control sequence to control a wheel slip control magnet valve during normal 1 ms interrupt operations after calibration of the smart resolution pressure controller. A primary control interrupt occurs every 20 ms and calculates a current pressure rate request value which is used during the normal 1 ms interrupt operations. A logic control means 46 provides the current pressure rate request value to a pressure rate request change decision means 48. The pressure rate request change decision means 48 receives data from the logic control means 46 and detects if the pressure rate request value is new. A valve timing set up means 52 is enabled by the pressure rate request change decision means 48 for setting (i.e., storing in the microprocessor 102) a pulse state, a pulse timer and a hold timer if the pressure rate request value is new. The terms "pulse state" and "pulse timer" includes a release state and release timer if the pressure rate request value provided by the logic control means 46 calls for a brake release pulse, and also includes an application state and application timer if a brake application pulse is required by the pressure rate request value.

A pulse timing means 54 is energized by either the pressure rate request change decision means 48, if there is no change in the pressure rate request value, or the valve timing set up means 52, if there is a new pressure rate request value. Pulse timing means 54 stores in the microprocessor 102 the previous interrupt remaining pulse time if there isn't a new pressure rate request value, or changes to a new pressure rate request pulse time and hold time if there is a new pressure rate request value. The pulse timing means 54 detects if the remaining pressure rate request value pulse time is greater than zero. If so, the pulse timing means 54 does not energize a hold timing means 56, but rather enables the pulse time decrement means 62 which, in turn, passes the pulse command (either release or apply) to a valve control means 66 which, in turn, sends a pulse enable signal to the wheel slip three-state brake control valve 106 and ends the interrupt to the microprocessor 102.

If the pulse timing means 54 has a pulse time remaining of 0, the pulse timing means 54 enables the hold timing means and does not energize the pulse time decrement means 62.

The hold timing means 56 checks the previous interrupt's remaining hold time stored in the microprocessor 102. The hold timing means 56 detects if the remaining pressure rate request value hold time is greater than zero. If so, the hold timing means 56 does not enable a timer's reset means 58, but rather enables a hold timer decrement means 64 which, in turn, passes the hold command to the valve control means 66.

If the remaining time in the hold timer means 56 is zero, the hold timing means 56 enables the timer's reset means 58 and does not enable the hold timer decrement means 64. The timer's reset means 58 resets the pulse timing means 54 and the hold timing means 56 to the current pressure rate request values. The timer's reset means 58 either (1) ends the interrupt to the microprocessor 102 by bypassing a closed loop feed back means 68 depending on whether the apparatus 20 uses a user test method of calibration such as shown in FIG. 1, in which case the close loop feedback means 68 would be bypassed as indicated by the dashed line in FIG. 5 and the calibrations process of FIG. 1 would be manually enabled by a user, or (2) enables a calibration process by the closed loop feedback means 68.

In the presently preferred embodiment, the overall control is based on a 20 ms interrupt software program control. In the prior art, a pressure rate request value of 12, for example, would be 80 ms Apply (4 times 20 ms) and 60 ms (3 times 20 ms) Hold. Advantageously, in the preferred embodiment of the present invention use of additional 1 millisecond interrupts allows the pressure rate request value of 12, for example, to be adjusted to values such as 74 ms Apply and 66 ms Hold (not limited to multiples of 20 ms). Additionally, through use of the smart resolution valve pressure control 10, the pressure rate request value of 12 could undergo frequent tuning that could vary the time of the apply pulse and hold pulse such that the pressure rate request value would consistently give the same airflow rate over the valve's cycle life. Note that one skilled in the art could easily place this calibration in the actual valve control sequence using closed loop feedback.

Also the presently preferred embodiment of this invention provides the ability of the smart resolution valve pressure control to provide accurate pressure outputs to the wheel slip three-state brake control valve which are within a desired bandwidth. The present invention utilizes an apparatus that relies on a self-adjusting calibrated pulse time for a minimum pressure adjustment. Through the use of a microprocessor based smart resolution valve pressure control system the valve cycles are reduced significantly thereby increasing the valve life cycle. The valve lifecycle is increased by avoiding alternate release and apply operations when the airflow is near 0 psi.

While both the presently preferred and a number of alternative embodiments of the present invention have been described in detail above it should be understood that various other adaptations and modifications of the present invention can be envisioned by those persons who are skilled in the relevant art without departing from either the spirit of the invention or the scope of the appended claims.

We claim:

1. A method for calibrating a smart resolution valve pressure control having a plurality of release times and a corresponding plurality of hold times said method comprising the additional steps of:

a) applying a release pulse of one of a first predetermined duration of a selected one of said plurality of release times and applying a hold pulse of a second predetermined duration corresponding to said selected one of said plurality of release times to a valve controlling pressure to a brake cylinder initially having a minimum first predetermined pressure;

b) measuring an elapsed time that said brake cylinder changes from a second predetermined pressure to a third predetermined pressure;

c) increasing said first predetermined duration and decreasing said second predetermined duration if said elapsed time is greater than a first predetermined time, and decreasing said first predetermined duration and increasing said second predetermined duration if said elapsed time is less than a second predetermined time; and d) repeating steps (a) through (c) if said first predetermined duration changes in step (c).

2. A method for calibrating a smart resolution valve pressure control, according to claim 1, wherein said method further includes:

a) receiving a signal to apply said selected one of said plurality of release times and said corresponding hold time;

b) determining if said selected one of said plurality of release times corresponds to a last preceding repetition of said smart resolution valve pressure control, and if so, continuing to apply said selected one of said release time and hold times.

3. The method for calibrating a smart resolution pressure control, according to claim 2, wherein step (b) includes the step of resetting a stored release time and hold time in said smart resolution pressure control to a current release time if said current release time is different than that of said last preceding repetition and applying said current release time.

4. A method for calibrating a smart resolution valve pressure control having a plurality of application times and a corresponding plurality of hold times said method comprising the steps of:

a) applying an application pulse of a first predetermined duration of a selected one of said plurality of application times and applying a hold pulse of a second predetermined duration corresponding to said selected one of said plurality of application times to a valve controlling pressure to a brake cylinder initially having a maximum first predetermined pressure;

b) measuring an elapsed time that said brake cylinder changes from a second predetermined pressure to a third predetermined pressure;

c) increasing said first predetermined duration and decreasing said second predetermined duration if said elapsed time is greater than a first predetermined time, and decreasing said first predetermined duration and increasing said second predetermined duration if said elapsed time is less than a second predetermined time; and d) repeating steps (a) through (c) if said first predetermined duration changes in step (c).

5. A method for calibrating a smart resolution valve pressure control, according to claim 4, wherein said method further includes:

a) receiving a signal to apply said selected one of said plurality of application times and said corresponding hold time; and b) determining if said selected one of said plurality of application times corresponds to a last preceding repetition of said smart resolution valve pressure control, and if so, continuing to apply said selected one of said release times and hold times.

6. The method for calibrating a smart resolution pressure control, according to claim 5, wherein step (b) includes the step of resetting a stored application time and hold time in said smart resolution pressure control to a current application time if said current application time is different than that of said last preceding repetition and applying said current application time.

* * * * *